United States Patent Office 3,006,951
Patented Oct. 31, 1961

3,006,951
PHARMACOLOGICAL COMPOUNDS
Emilio Testa, Milan, Italy, assignor to
Lepetit, S.p.A., Milan, Italy
No Drawing. Filed July 14, 1958, Ser. No. 748,149
Claims priority, application Great Britain July 23, 1957
7 Claims. (Cl. 260—488)

The present invention relates to new chemical compounds and a process for preparing them.

More particularly, the invention is concerned with new pharmacologically useful chemical compounds having the general formula

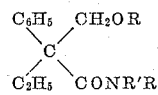

wherein R represents hydrogen or an acyl radical of a lower aliphatic carboxylic acid; R' and R" are the same or different and represent hydrogen or a lower alkyl, aralkyl or pyridylmethyl radical or NR'R" represents a nitrogen containing heterocyclic ring.

It is apparent to all those skilled in organic chemistry that these compounds, having an asymmetric carbon atom, may exist both in racemic and optically active forms. The invention extends to all possible forms of the compounds of the general formula. Examples of the preparation of every class of compounds are given hereinafter.

The compounds of the invention have proved particularly active as sedatives, hypnotics and anticonvulsants on laboratory animals. Their toxicity is exceptionally low and they show no untoward side effects on the autonomic nervous system, arterial pressure, heart and respiratory rate.

The racemates of the compounds of the invention are prepared by reacting one mole of racemic alpha-acetoxymethyl-alpha-phenylbutyryl chloride with an excess over one mole of ammonia or of the appropriate primary or secondary amine, according to the end product desired, at room or lower temperature. At the end of the reaction the mixture is diluted with water, made acidic by the addition of a mineral acid and extracted with a water immiscible solvent. The solvent is then evaporated in vacuo giving the amide in fairly good yields.

When the unsubstituted primary amide is desired, the reaction is best carried out by dissolving the starting acid chloride in ethyl ether and bubbling gaseous ammonia into the solution. After filtration from the formed inorganic salt, the product is isolated by evaporation of the solvent.

When optically active end products are desired, optically active alpha-acetoxymethyl-alpha-phenylbutyryl chloride having the formula

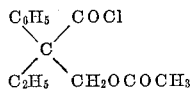

is used as the starting compound.

In any case, by the process described the products of the general formula in which R is acyl are obtained. To obtain the compounds in which R is hydrogen the acylated products are subjected to hydrolysis by conventional methods, e.g. by refluxing them with a 5% solution of potassium hydroxide in 50% ethanol.

The starting compound of the invention, i.e. an alpha-acyloxymethyl-alpha-phenylbutyryl chloride, both racemic and optically active, is a new compound and may be prepared by a process which is disclosed in the examples. By said process, an alkyl phenylethylmalonyl chloride (II) prepared by the action of thionyl chloride on a monoalkyl phenylethylmalonate (I), is hydrogenated to produce an alkyl alpha-hydroxymethyl-alpha-phenylbutyrate (III). The ester is then hydrolysed to the free acid, i.e. alpha-hydroxymethyl-alpha-phenylbutyric acid (IV), by conventional methods.

When racemic end compounds are desired, this last compound is acylated, giving an alpha-acyloxymethyl-alpha-phenyl-butyric acid (V), which is then converted into the racemic starting compound of the invention (VI). When optically active end compounds are desired, it is preferable to provide the resolution at the stage of compound IV. The resolution is carried out through the (−)-quinine salt according to usual methods of antipode resolution. The optical antipodes are then worked exactly as described for the racemic compounds.

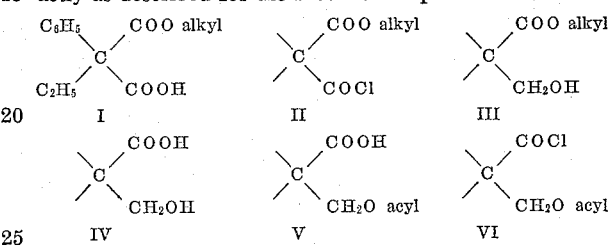

Of course the optically active compounds may be prepared also by resolving the racemates at different stages of the synthesis or more directly on the end compounds, using known procedures. In any case it is advantageous to effect the resolution on the compounds containing a free carboxyl group through the corresponding salts with the commonly used optically active bases.

Moreover, it is known to all organic chemists that the resolution is economically more convenient when it is carried out on an early stage of the synthesis rather than on more elaborate intermediate compounds.

The following non-limitative examples illustrate the invention.

EXAMPLE 1

*Preparation of alpha-acetoxymethyl-alpha-phenylbutyramide and of alpha-hydroxymethyl-alpha-phenylbutyramide*

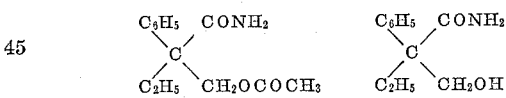

A mixture of 32 g. monoethyl phenylethylmalonate and 25 ml. freshly distilled thionyl chloride is refluxed for 2 hours. The excess thionyl chloride is removed in vacuo and the residue is distilled collecting at 133–135° C. under 2.5 mm. The yield is 30 g. (87%); M.P. 39–40° C.

Into a mixture of 15 g. sodium borohydride and 150 ml. anhydrous dioxane 68 g. of the above prepared alpha-carbethoxy-alpha-phenylbutyryl chloride dissolved in 300 ml. anhydrous dioxane are quickly added dropwise. The mixture is then refluxed under stirring for 2.5 hours, and then it is cooled. Five hundred millilitres of ice water are added, taking care not to exceed 25° C., then 10% HCl is added to acidic reaction and the mixture is extracted with ethyl ether. After removing the solvent the residue is distilled collecting at 140–145° C./2–3 mm. Yield 47 g. (80%) of ethyl alpha-phenyl-alpha-hydroxymethyl-butyrate.

The above ester (120 g.) is hydrolysed by refluxing it with 2000 ml. 10% sodium hydroxide for 6 hours. After cooling, the mixture is extracted with ethyl ether and the extract is discarded. The aqueous layer is made acidic to Congo red with hydrochloric acid and extracted with ethyl ether. After removing the solvent the residual oil crystallises on treatment with petroleum ether. Yield 80 g. (76%); M.P. 94–96° C.

A solution of 75 g. alpha-hydroxymethyl-alpha-phenylbutyric acid in 250 ml. acetic anhydride is refluxed for 1.5 hours and then the mixture is poured into 2500 ml. water at 60° C. After cooling, the solution is extracted with ethyl ether, the extract is washed with a 5% solution of sodium bicarbonate and with water, dried over sodium sulphate and evaporated to dryness. The residue is distilled in vacuo collecting at 230–234° C./3–5 mm. Yield 80 g. (98%); M.P. 72–73° C.

The above alpha-acetoxymethyl-alpha-phenylbutyric acid (36 g.) is converted into the acid chloride by refluxing it for 1.5 hours with 50 ml. thionyl chloride. The excess thionyl chloride is removed in vacuo and the residue distilled collecting at 132–134°/3 mm. Yield 38 g. (95%); M.P. 34–36° C.

Into a cooled solution of 40 g. alpha-acetoxymethyl-alpha-phenylbutyryl chloride in 500 ml. anhydrous ethyl ether ammonia is bubbled for 30 minutes. After 1 hour the precipitate is collected and washed with ethyl ether. The combined ether solution and washings are evaporated to dryness. Yield 35 g. (86%) of alpha-acetoxymethyl-alpha-phenylbutyramide; M.P. 90–92° C.

A mixture of 25 g. of the above product is refluxed for 30 minutes with 500 ml. of a 5% solution of potassium hydroxide in 50% ethanol. After evaporating the organic solvent the residue is extracted to dryness and the residue is recrystallised from benzene-petroleum ether. Yield 17 g. (83%) of alpha-hydroxymethyl-alpha-phenylbutyramide; M.P. 82–84°.

EXAMPLE 2

*Preparation of alpha-acetoxymethyl-alpha-phenyl-N,N-diethylbutyramide and of alpha-hydroxymethyl-alpha-phenyl-N,N-diethylbutyramide*

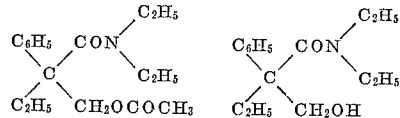

Into 45 ml. freshly distilled diethylamine 15 g. alpha-acetoxymethyl-alpha-phenylbutyryl chloride are added dropwise over 30 minutes with cooling. After 2 hours the mixture is poured into 500 ml. ice water, made acidic with hydrochloric acid and extracted with ethyl ether. The solvent is removed in vacuo and the residue distilled collecting at 135–140° C./0.5–1 mm. Yield 14 g. (82%) of alpha-acetoxymethyl-alpha-phenyl-N,N-diethylbutyramide.

Twenty-five grams of the above amide are hydrolysed by refluxing for 30 minutes with a mixture of 100 ml. 95% ethanol and 100 ml. 10% aqueous sodium hydroxide. After removing the solvent the residue is extracted with ethyl ether, the ether is removed in vacuo and the residue distilled collecting at 135–140° C./1–1.5 mm. Yield 20 g. (93%) of alpha-hydroxymethyl-alpha-phenyl-N,N-diethylbutyramide.

EXAMPLE 3

*Preparation of alpha-hydroxymethyl-alpha-phenyl-N-ethylbutyramide*

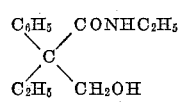

To 10.7 g. ethylamine cooled at −10° C. 4.5 g. alpha-acetoxymethyl-alpha-phenylbutyryl chloride are added over about 30 minutes taking care that the temperature does not exceed +5° C. After 2 hours at 5° C. the excess base is distilled in vacuo and the residue is treated with water. The mixture is made acidic with hydrochloric acid and extracted with ethyl ether, the ether extract is evaporated and the residue distilled collecting at 170–175° C./1 mm. Under these conditions hydrolysis of the acetyl group takes place. Yield 3 g. (77%) of alpha-hydroxymethyl-alpha-phenyl-N-ethylbutyramide.

EXAMPLE 4

*Preparation of 1-(alpha-acetoxymethyl-alpha-phenylbutyryl)-4-ethylpiperazine*

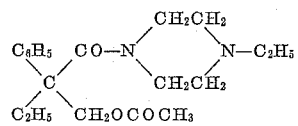

To 5 g. alpha-acetoxymethyl-alpha-phenylbutyryl chloride, 5 g. 1-ethylpiperazine are cautiously added, and the slurry is stirred until the reaction subsides. After addition of 50 ml. water, the mixture is made alkaline with 50% aqueous sodium hydroxide, extracted with ethyl ether, the solvent removed in vacuo and the residue distilled collecting at 175–180°/25 mm. Yield 5 g. (77%) of 1-(alpha-acetoxymethyl-alpha-phenylbutyryl)-4-ethylpiperazine.

EXAMPLE 5

*4-(alpha-acetoxymethyl-alpha-phenylbutyryl)-morpholine*

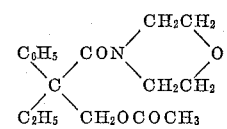

To 45 g. morpholine 7.5 g. alpha-acetoxymethyl-alpha-phenylbutyryl chloride are added dropwise taking care not to exceed 5° C. The mixture is stirred for 30 minutes and after addition of ice water it is made acidic with hydrochloric acid and extracted with ethyl ether. The solvent is removed in vacuo and the residue is treated with a small amount of petroleum ether and collected. Yield 8.5 g. (94%); M.P. 111–113° C.

EXAMPLE 6

*1-(alpha-acetoxymethyl-alpha-phenylbutyryl)-piperidine*

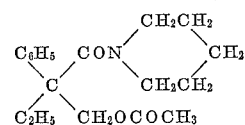

To 50 g. piperidine 7.5 g. alpha-acetoxymethyl-alpha-phenylbutyryl chloride are added dropwise with stirring with external cooling below 5° C. After 30 minutes at room temperature the mixture is diluted with ice water, acidified with hydrochloric acid and extracted with ethyl ether. The solvent is removed in vacuo and the residue treated with petroleum ether and collected. Yield 8 g. (88%); M.P. 72–74° C.

EXAMPLE 7

*Alpha-acetoxymethyl-alpha-phenyl-N-methyl-N-(4-pyridylmethyl)-butyramide*

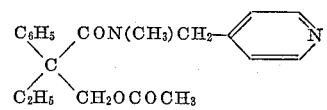

Into a solution of 12 g. methyl-4-pyridylmethylamine in 20 ml. ethyl ether 5 g. alpha-acetoxymethyl-alpha-phenylbutyryl chloride are added dropwise over about 30 minutes. After an additional 30 minutes the mixture is diluted with ice water, made neutral with hydrochloric acid and extracted with ethyl ether. After removing the solvent the residue crystallises on standing and is recrystallised from ligroin. Yield 4 g. (71%); M.P. 96–98° C.

EXAMPLE 8

(−) *and* (+)-*alpha-acetoxymethyl-alpha - phenylbutyramide and* (−) *and* (+)-*alpha-hydroxymethyl-alpha-phenylbutyramide*

A solution is prepared from 70 g. DL-alpha-hydroxymethyl-alpha-phenylbutyric acid (prepared as described in Example 1), 116.8 g. (−)-quinine, 290 ml. hot anhydrous ethanol and 290 ml. warm water. After 24 hours an abundant precipitate forms, which is collected and recrystallised from ethanol-water 1:1. Yield 80 g. (78%) of the (−)-quinine salt of (+)-alpha-hydroxymethyl-alpha-phenylbutyric acid, M.P. 133–134° C., $[\alpha]_D^{20}$—135.7° (c. 2.1, ethanol).

The quinine salt is suspended in 300 ml. water and treated with 150 ml. 50% sodium hydroxide. The resulting suspension is extracted with ethyl ether and the water layer is acidified with hydrochloric acid and extracted with ethyl ether. This latter extract is dried over sodium sulphate and evaporated in vacuo to dryness. The residual oil crystallized on standing. Yield 26 g. (96%) of (+) - alpha - hydroxymethyl - alpha-phenylbutyric acid, M.P. 80–81° C., $[\alpha]_D^{20}$+11.5° (c. 2, ethanol).

The (−)-antipode is prepared from the filtrate of the first crystallisation of the (−)-quinine salt of the (+)-antipode, by evaporating the filtrate to dryness and decomposing the quinine salt with sodium hydrate. Yield 25 g. (92%) of (−)-alpha-hydroxymethyl-alpha-phenylbutyric acid, $[\alpha]_D^{20}$—11.2° (c. 2, ethanol); M.P. 80–81° C.

The antipodes are independently acetylated and the crude acetylated derivatives converted into the acyl chlorides as described in Example 1 for the racemate. A pure sample of both acetylated antipodes has M.P. 72–73° C.; B.P. 230–234° C./3–5 mm. The optically active chlorides have B.P. 150–155° C./1.5 mm.

The preparation of the optically active alpha-acetoxymethyl-alpha - phenylbutyramides and alpha - hydroxymethyl-alpha-phenylbutyramides has been also carried out exactly as described in Example 1 for the racemates. The physical properties of the compounds are as follows:

(+)-alpha - acetoxymethyl - alpha - phenylbutyramides: M.P. 76–77° C.; $[\alpha]_D^{20}$+28.9° (c. 2, ethanol).

(−)-alpha - acetoxymethyl - alpha - phenylbutyramide: M.P. 76–77° C.; $[\alpha]_D^{20}$—19.55° (c. 0.5, ethanol).

(+)-alpha - hydroxymethyl - alpha - phenylbutyramide: B.P. 170–175° C./0.5 mm.; $[\alpha]_D^{20}$+22.4° (c. 0.85, ethanol).

(−)-alpha - hydroxymethyl - alpha - phenylbutyramide: B.P. 180–185° C./2 mm.; $[\alpha]_D^{20}$ —12.0° (c. 2, ethanol).

What I claim is:
1. A compound of the formula

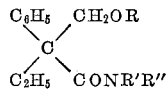

wherein R is a member of the group consisting of hydrogen and lower aliphatic carboxylic acid acyls, R' and R" are members of the group consisting of hydrogen, lower alkyl groups, aralkyl groups and groups in which R' and R" are joined to each other to form a monocyclic heterocyclic group with the nitrogen in the ring, of the group consisting of piperidino, piperazino and morpholino.

2. DL-alpha-hydroxymethyl-alpha-phenylbutyramide.
3. The dextrorotatory form of the compound of claim 2.
4. The levorotatory form of the compound of claim 2.
5. DL-alpha-acetoxymethyl-alpha-phenylbutyramide.
6. The dextrorotatory form of the compound of claim 5.
7. The levorotatory form of the compound of claim 5.

References Cited in the file of this patent
UNITED STATES PATENTS 2,347,722    Wenner ---------------- May 2, 1944
2,347,723    Wenner ---------------- May 2, 1944

OTHER REFERENCES

Beilstein: "Handbuch der organischen Chemie," Second Supplement, vol. 10, 1949, pp. 158–159.